United States Patent
Wiberg et al.

(10) Patent No.: US 11,916,835 B2
(45) Date of Patent: *Feb. 27, 2024

(54) METHODS AND APPARATUS RELATING TO SELECTIVE ENHANCEMENT OF RADIO SIGNALS

(71) Applicant: Telefonaktiebolaget LM Ericsson (publ), Stockholm (SE)

(72) Inventors: Niclas Wiberg, Linköping (SE); Håkan Andersson, Linköping (SE); Andreas Bergström, Vikingstad (SE); Johan Furuskog, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,620

(22) Filed: Dec. 10, 2021

(65) Prior Publication Data

US 2022/0103327 A1 Mar. 31, 2022

Related U.S. Application Data

(63) Continuation of application No. 15/529,098, filed as application No. PCT/EP2016/073935 on Oct. 6, 2016, now Pat. No. 11,223,460.

(Continued)

(51) Int. Cl.
*H04L 5/00* (2006.01)
*H04W 72/542* (2023.01)
(Continued)

(52) U.S. Cl.
CPC ......... *H04L 5/0051* (2013.01); *H04B 7/0452* (2013.01); *H04B 7/0617* (2013.01);
(Continued)

(58) Field of Classification Search
CPC ... H04L 5/0051; H04L 5/0048; H04L 5/0091; H04L 5/0035; H04B 7/0452;
(Continued)

(56) References Cited

U.S. PATENT DOCUMENTS 9,882,622 B2 * 1/2018 Jeong .................. H04B 7/0862
10,225,054 B2 3/2019 Shin et al.
(Continued)

FOREIGN PATENT DOCUMENTS

| CN | 103733668 A | 4/2014 |
| CN | 105027461 A | 11/2015 |

(Continued)

OTHER PUBLICATIONS

"DCI Format Design for LTE-A PUSCH Transmission", 3GPP TSG RAN WG1 Meeting #60, R1-100938, San Francisco, CA, Feb. 22-26, 2010, pp. 1-7.

*Primary Examiner* — Rownak Islam
(74) *Attorney, Agent, or Firm* — Murphy, Bilak & Homiller, PLLC

(57) ABSTRACT

A method, performed in a User Equipment (UE), is disclosed. The method is for facilitating the establishing of a UE processing configuration for the selective enhancement of radio signals received or transmitted by the UE. The method comprises receiving from a Transmission Point (TP) of a wireless network an indication that an identified reference signal is usable by the UE for establishing a UE processing configuration, and receiving the identified reference signal from a Transmission Point of the wireless network.

20 Claims, 6 Drawing Sheets

Related U.S. Application Data

(60) Provisional application No. 62/244,944, filed on Oct. 22, 2015.

(51) Int. Cl.
  *H04B 7/0452* (2017.01)
  *H04B 7/06* (2006.01)
  *H04W 72/02* (2009.01)
  *H04B 7/0413* (2017.01)

(52) U.S. Cl.
  CPC .......... *H04L 5/0048* (2013.01); *H04L 5/0091* (2013.01); *H04W 72/02* (2013.01); *H04W 72/542* (2023.01); *H04B 7/0413* (2013.01); *H04B 7/0619* (2013.01); *H04L 5/0035* (2013.01)

(58) Field of Classification Search
  CPC .. H04B 7/0617; H04B 7/0413; H04B 7/0619; H04W 72/02; H04W 72/085; H04W 72/542
  USPC .......................................................... 370/329
  See application file for complete search history.

(56) References Cited

U.S. PATENT DOCUMENTS

| | | |
|---|---|---|
| 2004/0147290 A1 | 7/2004 | Kikuchi |
| 2013/0039401 A1 | 2/2013 | Han et al. |
| 2013/0222351 A1 | 8/2013 | Kao et al. |
| 2013/0223251 A1 | 8/2013 | Li et al. |
| 2013/0244676 A1 | 9/2013 | Koivisto et al. |
| 2013/0301454 A1 | 11/2013 | Seol et al. |
| 2013/0301567 A1 | 11/2013 | Jeong et al. |
| 2014/0016497 A1 | 1/2014 | Seo et al. |
| 2015/0049824 A1 | 2/2015 | Kim et al. |
| 2015/0162966 A1 | 6/2015 | Kim et al. |
| 2015/0173064 A1 | 6/2015 | Kim et al. |
| 2016/0065290 A1* | 3/2016 | Zhu .................... H04L 43/16 370/329 |
| 2016/0112173 A1 | 4/2016 | Wang et al. |
| 2016/0134352 A1 | 5/2016 | Stirling-Gallacher |
| 2016/0165458 A1 | 6/2016 | Peng et al. |
| 2016/0211899 A1 | 7/2016 | Yang et al. |
| 2016/0226640 A1 | 8/2016 | Seol et al. |
| 2016/0301506 A1 | 10/2016 | Halbauer et al. |
| 2017/0033904 A1 | 2/2017 | Stirling-Gallacher et al. |
| 2017/0047976 A1 | 2/2017 | Noh et al. |

FOREIGN PATENT DOCUMENTS

| | | |
|---|---|---|
| JP | 2004228819 A | 8/2004 |
| JP | 2010239607 A | 10/2010 |
| JP | 2014502064 A | 1/2014 |
| JP | 2015523757 A | 8/2015 |
| JP | 2015532039 A | 11/2015 |
| JP | 2020120674 A | 8/2020 |
| RU | 2153226 C2 | 7/2000 |
| WO | 2013132920 A1 | 9/2013 |
| WO | 2013165149 A1 | 11/2013 |
| WO | 2014027824 A1 | 2/2014 |
| WO | 2014126423 A1 | 8/2014 |
| WO | 2015024228 A1 | 2/2015 |
| WO | 2015064952 A1 | 5/2015 |
| WO | 2015080645 A1 | 6/2015 |
| WO | 2015080648 A1 | 6/2015 |

\* cited by examiner

METHODS AND APPARATUS RELATING TO SELECTIVE ENHANCEMENT OF RADIO SIGNALS

RELATED APPLICATIONS

This application is a continuation of U.S. application Ser. No. 15/529,098 filed 24 May 2017, which is a U.S. National Phase Application of PCT/EP2016/073935 filed 6 Oct. 2016, which claims benefit of Provisional Application No. 62/244,944 filed 22 Oct. 2015. The entire contents of each aforementioned application is incorporated herein by reference.

TECHNICAL FIELD

The present disclosure relates to methods performed in a User Equipment (UE) and in a wireless network for facilitating the establishing by a UE of a UE processing configuration for the selective enhancement of radio signals received or transmitted by the UE. The present disclosure also relates to a UE, a wireless network entity and to a computer program.

BACKGROUND

In a wireless network it is often desirable to be able to selectively enhance radio signals transmitted to or received from a particular direction. A common example of this process is spatial filtering, which may also be referred to as beamforming, and may be applied to both the transmission and reception of radio signals. Transmission beamforming involves amplifying a transmitted signal in a selected direction, while weakening the signal in other directions. Reception beamforming involves amplifying a desired signal received from a particular direction, while weakening unwanted signals from other directions. Beamforming increases the strength of a received signal over an individual connection, for example between a Base Station (BS) or other wireless network Transmission Point (TP) and a User Equipment (UE), and so enhances the throughput and coverage for that connection. Beamforming also reduces interference from unwanted signals, thereby enabling several simultaneous transmissions over multiple individual connections using the same resources in the time-frequency grid, so called Multi user MIMO.

Beamforming may be referred to as analog, involving signal processing at the Radio Frequency carrier, intermediate frequency or baseband level, or digital, involving signal processing in the digital domain, after Analog-to-Digital conversion on a receiving side and before Digital-to-Analog conversion on a transmitting side. Both analog and digital beamforming may be used for transmission and/or reception in the Uplink (UL) and Downlink (DL) directions of a wireless network.

An important challenge in the use of beamforming for radio signal exchange is the selection of a direction, or combination of directions, in which to enhance transmitted or received signals. Each possible selection corresponds to a particular configuration of different transmission or reception elements and analog and/or digital processing elements within a transmitting or receiving entity, which configuration of elements results in the selective enhancement of signals transmitted to or received from that particular direction or combination of directions. In order to support beamforming in a Base Station for DL transmissions, a number of reference signals may be transmitted by the BS to a UE, each reference signal being transmitted using a different BS processing configuration, or "beam". The UE may then measure the received reference signals and report the measurement results back to the BS, enabling the BS to select a suitable beam for transmission of data to the UE. In many communication networks, including for example LTE or 5G networks, both permanent and dynamic reference signals may be used to assist with BS beamforming.

Permanent reference signals, referred to in the following specification as PRS, are transmitted periodically in a large number of different directions by a BS, allowing individual UEs to measure and report back to the BS without the need for any special arrangement between the BS and individual UEs. Individual UEs send measurement reports to the BS indicating the strength of different received PRS, for example via RSRP readings or other signal strength measurements. The BS may then identify one or more beams for which the reference signals are reported as being received by the UE strongly, or with good quality, and to use those beams for the transmission of dedicated data signals to the UE. As the PRS are transmitted periodically over a large number of beams, the repetition period is necessarily relatively long, in order to avoid monopolising radio resources required for other purposes.

Dynamic reference signals, known as Channel State Information Reference Signals (CSI-RS), are transmitted by a BS only when needed for a particular connection. A decision as to when and how to transmit CSI-RS is made by the BS and signalled to the UE or UEs concerned. The decision may be signalled using a dedicated message known as a measurement grant, or may alternatively be signalled using a configuration message that establishes a periodic transmission of CSI-RS, for example over a defined time period. When a UE receives a measurement grant or configuration message it conducts measurements on the CSI-RS corresponding to the measurement grant or configuration message and reports these measurements back to the BS. In some situations, the BS may elect to transmit CSI-RS to a UE using a beam or beams that are known to be strong for that particular UE, so enabling the UE to report more detailed information about those beams. In other situations, the BS may transmit CSI-RS using a beam or beams that are not known to be strong for that UE, for example to facilitate fast detection of new beams when a UE is moving.

Various additional reference signals may also be transmitted by a BS, including for example Demodulation Reference Signals (DMRS) which are included when transmitting control information or data to a UE. Owing to the importance of ensuring that the control data is received by the UE, such transmissions are typically made using a beam or beams that are known to be strong for that UE.

As discussed above, beamforming may also be performed for the reception of radio signals, and a UE may thus perform beamforming for the reception of DL transmissions, further enhancing the received signal and suppressing interference signals. In order to identify the best configuration of analog and/or digital processing elements for receiving a given DL signal, a UE may try receiving reference signals from a BS using different receiving processing configurations, or receiving beams, and assessing which configuration results in the most effective enhancement of the desired signal. Care should be taken to ensure that the UE only compares signal strengths achieved with different receiving beams for reference signals transmitted with the same or similar transmission beams from the BS, otherwise the cause of any difference in received signal strength cannot be isolated to the UE receiving beams, as it could also originate with the different BS transmission beams.

UE beamforming may be performed using PRS transmissions, for example trialling each possible UE reception processing configuration, or receiving beam, for the reception of each different PRS signal. In this manner the most effective receiving beam may be identified for each transmission beam used by the BS to transmit the PRS. However, this process can be very time consuming, as multiple repetitions of each PRS may be needed to trial the full range of UE receiving beams, and as mentioned above, the repetition period for PRS tends to be relatively long. In addition, it is not possible for a UE to optimise its processing configurations for the suppression of a particular interfering signal, as the UE has no information about which BS beams may be used for interfering signals. The UE can only seek to optimise signal enhancement for potential data signals that might be transmitted on any of the BS beams used to transmit the PRS.

CSI-RS transmissions do not offer a reliable alternative to PRS transmissions for UE beamforming, as the BS beams used to transmit CSI-RS are not known to the UE, and may not be used by the BS for future data transmissions. As mentioned above, CSI-RS are often used by the BS to scan over new BS beams, in an effort to identify new BS beams which may become stronger for a UE as it changes position. Reception beamforming on the basis of such beams is therefore of very limited value.

DMRS transmissions are not appropriate for UE beamforming, owing to the importance of ensuring that the control data accompanying these signals is received by the UE. If a UE beam with unknown properties is used to receive the DMRS, the corresponding data or control information may be lost if the UE beam turns out to be ill adapted to the BS beam used for transmission of the DMRS. Such losses may result in an unacceptable degradation of overall performance.

It will be appreciated from the above discussion that multiple challenges remain to be addressed in the optimisation of processing configurations for the selective enhancement of radio signals exchanged in a communication network.

The above discussion addresses BS and UE beamforming in the DL direction. However, it will be appreciated that similar processes and challenges may be encountered in the UL direction, with transmission beamforming taking place in the UE and reception beamforming taking place in the BS. UE transmission beamforming may be determined based on measurements made in the DL, as the directional aspects of the radio propagation properties are often similar between UL and DL. Thus, UE beamforming measurements can be made on DL reference signals such as PRS, and these measurements may be used to select a suitable beamforming for the UL, i.e. for UE transmission beamforming.

SUMMARY

It is an aim of the present disclosure to provide a method and apparatus which obviate or reduce at least one or more of the disadvantages mentioned above.

According to a first aspect of the present disclosure, there is provided a method, performed in a User Equipment (UE), for facilitating the establishing of a UE processing configuration for the selective enhancement of radio signals received or transmitted by the UE. The method comprises receiving from a Transmission Point of a wireless network an indication that an identified reference signal is usable by the UE for establishing a UE processing configuration, and receiving the identified reference signal from a Transmission Point of the wireless network.

According to examples of the disclosure, the identified reference signal may be received from at least one of the Transmission Point from which the indication was received, or another Transmission Point within the wireless network.

According to examples of the disclosure, the method may further comprise identifying a UE processing configuration that is adapted to a characteristic of the identified reference signal, and using the identified UE processing configuration to perform at least one of transmitting or receiving radio signals, wherein identifying a UE processing configuration that is adapted to a characteristic of the identified reference signal comprises identifying a UE processing configuration that selectively enhances the identified reference signal.

According to examples of the disclosure, the characteristic of the identified reference signal may determine an effect of the UE processing configuration.

According to examples of the disclosure, the characteristic of the identified reference signal may be determined by a processing configuration used by the wireless network in transmitting the reference signal via the Transmission Point.

According to examples of the disclosure, the UE processing configuration may comprise a configuration of elements in at least one of a transmitting or receiving unit in the UE.

According to examples of the disclosure, the UE processing configuration may comprise at least one of a radio frequency, intermediate frequency or baseband processing configuration or a digital processing configuration.

According to examples of the disclosure, the UE processing configuration may comprise a beamforming configuration, which may for example be an analog or a digital beamforming configuration.

According to examples of the disclosure, identifying a UE processing configuration that selectively enhances the identified reference signal may comprise iteratively testing UE processing configurations for reception of the identified reference signal.

According to examples of the disclosure, identifying a UE processing configuration that selectively enhances the identified reference signal may comprise retrieving context information for the reception of the identified reference signal, inputting the retrieved context information to a selection algorithm, receiving a suggested UE processing configuration from the selection algorithm, and testing the suggested UE processing configuration for reception of the identified reference signal.

According to examples of the disclosure, identifying a UE processing configuration that selectively enhances the identified reference signal may comprise selecting a UE processing configuration which the UE has previously used for receiving the identified reference signal and optimising the selected UE processing configuration to increase the selective enhancement of the identified reference signal.

According to examples of the disclosure, identifying a UE processing configuration that selectively enhances the identified reference signal may comprise assessing, for the identified reference signal received with a UE processing configuration, at least one of signal strength, noise, interference strength, estimated bit rate that could be achieved for data transmission, and/or signal quality.

According to examples of the disclosure, receiving an indication that an identified reference signal is usable by the UE for establishing a UE processing configuration may comprise receiving a message containing an identification of the reference signal and the indication that the identified reference signal is usable for establishing a UE processing configuration.

According to examples of the disclosure, the message may comprise a Measurement Grant Message or a Configuration Message, and optionally, the indication may comprise a flag.

According to examples of the disclosure, the method may further comprise receiving an indication that a plurality of identified reference signals is usable by the UE for establishing a UE processing configuration, and receiving the plurality of identified reference signals from a Transmission Point, wherein each of the plurality of identified reference signal comprises a different characteristic.

According to examples of the disclosure, identifying a UE processing configuration that is adapted to a characteristic of the identified reference signal may comprise at least one of identifying a UE processing configuration that is adapted to the characteristics of at least a majority of the plurality of identified reference signals, or identifying a first UE processing configuration that is adapted to a characteristic of at least one of the plurality of identified reference signals and identifying a second UE processing configuration that is adapted to a characteristic of another of the plurality of identified reference signals.

According to examples of the disclosure, the indication may include a designation of at least one reference signal as usable for establishing a reception UE processing configuration and a designation of at least one reference signal as usable for establishing a transmission UE processing configuration. According to such examples, identifying a UE processing configuration that is adapted to a characteristic of the identified reference signal may comprise identifying a reception UE processing configuration that is adapted to a characteristic of the reference signal usable for establishing a reception UE processing configuration, and identifying a transmission UE processing configuration that is adapted to a characteristic of the reference signal usable for establishing a transmission UE processing configuration.

According to examples of the disclosure, the indication may include a designation of at least one reference signal as a data reference signal and a designation of at least one reference signal as an interference reference signal. According to such examples, identifying a UE processing configuration that is adapted to a characteristic of the identified reference signal may comprise identifying a UE processing configuration that selectively enhances a data signal and selectively attenuates an interference signal when the data signal is transmitted with the characteristic of the data reference signal and the interference signal is transmitted with the characteristic of the interference reference signal.

According to examples of the disclosure, the UE may comprise at least two receiving units, and identifying a UE processing configuration that is adapted to a characteristic of the identified reference signal may comprise identifying a first UE processing configuration of the first receiving unit, and a second UE processing configuration of the second receiving unit, which UE processing combinations in combination selectively enhance the identified reference signal, or plurality of identified reference signals. The receiving units may for example be component parts of transceiver units or other interface units, or may be dedicated receiving units.

According to examples of the disclosure, the method may further comprise assembling a measurement report for each of the received identified reference signals or a combination of the received identified reference signals, and sending the measurement reports to a Transmission Point of the wireless network.

According to examples of the disclosure, the method may further comprise assembling a candidate set of reference signals on the basis of the measurement reports, and identifying a UE processing configuration that is adapted to a characteristic of the identified reference signal may comprise identifying a UE processing configuration that is adapted to a characteristic of at least one of the reference signals of the candidate set.

According to examples of the disclosure, the reference signal may comprise at least one of a Permanent Reference Signal, PRS, or a Channel State Information Reference Signal, CSI-RS.

According to another aspect of the present disclosure, there is provided a method, performed in a wireless network, for facilitating the establishment, in a User Equipment (UE), of a UE processing configuration for the selective enhancement of radio signals received or transmitted by the UE. The method comprises selecting a reference signal usable by the UE for establishing the UE processing configuration, and selecting a wireless network processing configuration for sending the selected reference signal to the UE via a Transmission Point, of the wireless network, wherein the wireless network processing configuration imparts a characteristic to the reference signal. The method further comprises sending to the UE an indication that the selected reference signal is usable by the UE for establishing the UE processing configuration, and sending the selected reference signal to the UE using the selected wireless network processing configuration.

According to another aspect of the present disclosure, there is provided a User Equipment (UE) configured to establish a UE processing configuration for the selective enhancement of radio signals received or transmitted by the UE. The UE comprises a receiving unit configured to receive from a Transmission Point of a wireless network an indication that an identified reference signal is usable by the UE for establishing a UE processing configuration, and to receive the identified reference signal from a Transmission Point of the wireless network.

According to examples of the disclosure, the UE further comprises an identifying unit configured to identify a UE processing configuration that is adapted to a characteristic of the identified reference signal, and a processing unit configured to use the identified UE processing configuration to perform at least one of transmitting or receiving radio signals. The identifying unit may be configured to identify a UE processing configuration that is adapted to a characteristic of the identified reference signal by identifying a UE processing configuration that selectively enhances the identified reference signal.

According to examples of the disclosure, the receiving unit may comprise at least one antenna and at least one signal processing unit configured to process signals received by the antenna, and the UE processing configuration may comprise a configuration of at least one of the antenna or the signal processing unit.

According to another aspect of the present disclosure, there is provided a wireless network entity configured to facilitate the establishment, in a User Equipment (UE) of a UE processing configuration for the selective enhancement of radio signals received or transmitted by the UE. The wireless network entity comprises a reference signal unit configured to select a reference signal usable by the UE for establishing the UE processing configuration. The wireless network entity also comprises a processing configuration unit configured to select a wireless network processing configuration for sending the selected reference signal to the UE via a Transmission Point, of the wireless network, wherein the wireless network processing configuration imparts a characteristic to the reference signal. The wireless network entity also comprises a transmission unit configured to send to the UE an indication that the selected reference signal is usable by the UE for establishing the UE processing configuration, and to send the selected reference signal to the UE using the selected wireless network processing configuration.

According to another aspect of the present disclosure, there is provided a User Equipment (UE) configured to establish a UE processing configuration for the selective enhancement of radio signals received or transmitted by the UE. The UE comprises a processor and a memory, the memory containing instructions executable by the processor whereby the UE is operative to receive from a Transmission Point of a wireless network an indication that an identified reference signal is usable by the UE for establishing a UE processing configuration, and receive the identified reference signal from a Transmission Point of the wireless network.

According to another aspect of the present disclosure, there is provided a wireless network entity configured to facilitate the establishment, in a User Equipment, UE of a UE processing configuration for the selective enhancement of radio signals received or transmitted by the UE. The wireless network entity comprises a processor and a memory, the memory containing instructions executable by the processor whereby the wireless network entity is operative to select a reference signal usable by the UE for establishing the UE processing configuration, select a wireless network processing configuration for sending the selected reference signal to the UE via a Transmission Point of the wireless network, wherein the wireless network processing configuration imparts a characteristic to the reference signal, send to the UE an indication that the selected reference signal is usable by the UE for establishing the UE processing configuration, and send the selected reference signal to the UE using the selected wireless network processing configuration.

According to another aspect of the present disclosure, there is provided a computer program comprising instructions which, when executed on at least one processor, cause the at least one processor to carry out a method according to wither of the first two aspects of the present disclosure.

According to another aspect of the present disclosure, there is provided a carrier containing a computer program according to the preceding aspect of the present disclosure, the carrier comprising an electronic signal, an optical signal, a radio signal or a computer readable storage medium.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
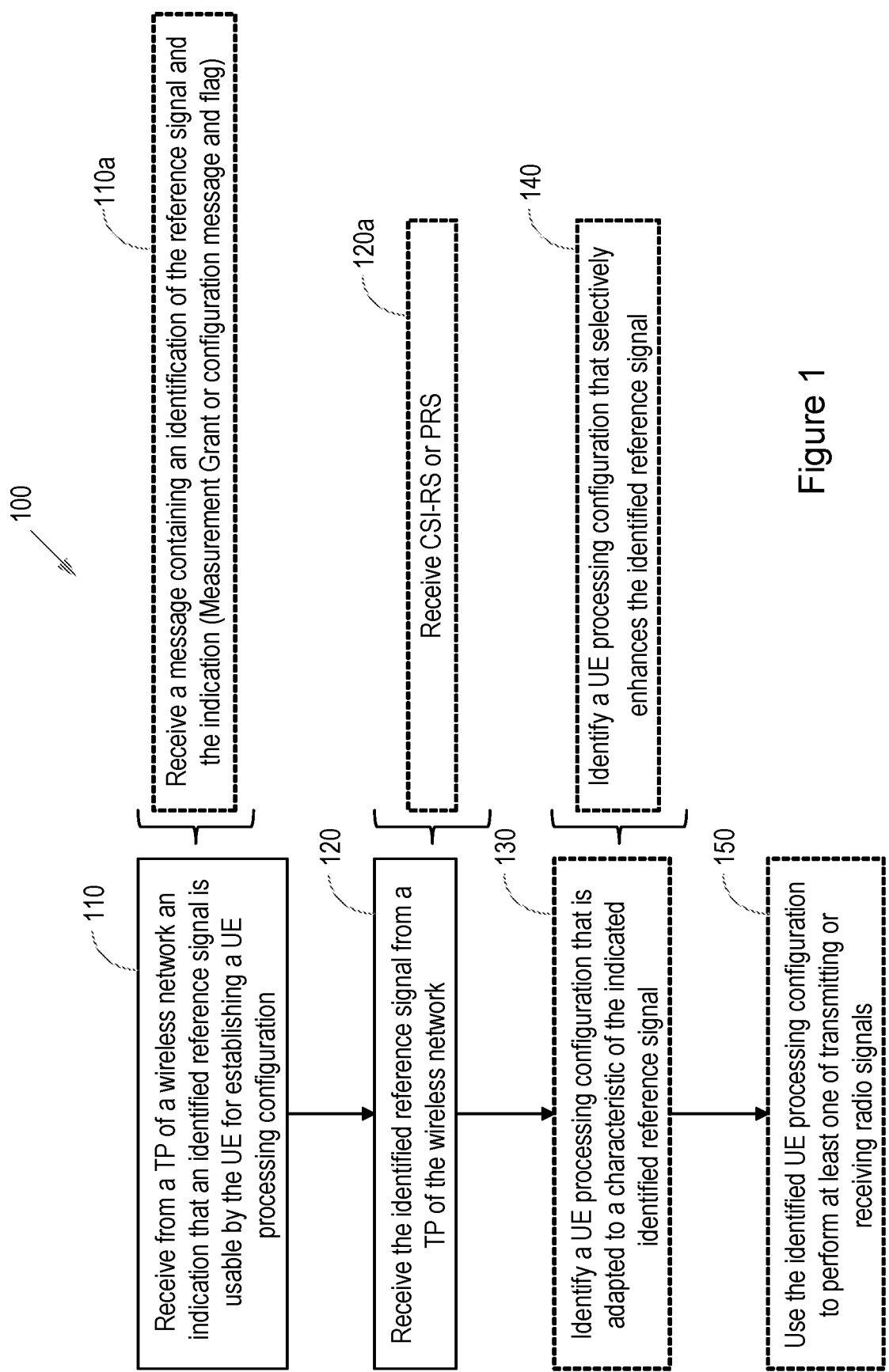
FIG. 1 is a flow chart illustrating process steps in a method performed in a UE for facilitating the establishing of a UE processing configuration for the selective enhancement of radio signals received or transmitted by the UE.

Aspects of the present disclosure provide methods according to which a wireless network provides to a UE an indication that an identified reference signal is usable by the UE for establishing a UE processing configuration for the selective enhancement of radio signals. The UE then receives the identified reference signal, and may use the reference signal to establish a UE processing configuration. The UE processing configuration or the selective enhancement of radio signals may in some examples provide for beamforming of a receive beam. This may enable focussing a receiver of the UE, for example using a plurality of antenna elements, to amplify or select a transmission received from a particular direction, for example, the direction from which the reference signal is transmitted. The UE receives an indication that a particular reference signal is suitable for configuring the UE, e.g. the network node will be using the same beam configuration for future transmissions to the UE. Thus, the UE is informed by the indication that the particular reference signal, and not merely that type of reference signal, can be used as a basis for carrying out configuration (e.g. receive beamforming configuration) of the UE. A reference signal carried by a different beam may not be suitable for UE configuration, and so may not be indicated as suitable for use in UE configuration.

Selective enhancement of radio signals involves the amplification of a targeted signal, possibly in the presence of other non-targeted signals. In a transmission situation, this may involve amplifying a transmitted signal in a certain direction or combination of directions, while attenuating the transmitted signal in other directions. In a reception situation, this may involve amplifying a received signal and attenuating any interfering signals which may also be present. Selective enhancement may be accomplished in a variety of different ways. One example is beamforming, e.g. analog or digital beamforming, as discussed above. The beamforming may include the selective combination or processing of radio signals in a phased array antenna so as to amplify a signal transmitted to or received from a certain well defined direction, and to attenuate signals transmitted to or received from other directions. This allows for selection of signals received only from a configured direction. In further examples, other cases of linear spatial processing may be used to achieve selective enhancement of radio signals, for example through transmitter precoding, such as zero-forcing precoding or maximum ratio transmission, or receiver antenna combining, including maximum ratio combining or interference rejection combining. Adaptive linear filtering in the digital or analog domain may also be used to achieve selective enhancement of radio signals, such as zero forcing equalization or minimum mean square error equalization, as may adaptive space-time precoding. Further examples may be envisaged according to which the selective enhancement of radio signals may be achieved.

The UE processing configuration to be established by the UE may thus comprise a configuration of elements in at least one of a transmitting or receiving unit or a transceiver of the UE, including for example configuration of one or more antennas, pre- and/or post-coding units, pre- or post-processing units, antenna combining units, adaptive filtering, adaptive space time precoding etc. The UE processing configuration may for example be a beamforming configuration for reception or transmission beamforming of radio signals. In further examples, the UE processing configuration may be a configuration of elements for achieving the selective enhancement of a received signal in other ways, including a configuration for linear spatial processing, adaptive linear filtering, adaptive uplink space-time precoding, etc. Following receipt of the indication from the wireless network, and the identified reference signal, the UE may establish a UE processing configuration using the identified reference signal and may use the established processing configuration for selective enhancement of received or transmitted signals. For example the UE may use the established UE processing configuration to amplify a received signal in the DL while seeking to attenuate any interfering signals which may be present. Alternatively, the UE may use the established UE processing configuration for selective enhancement of a transmitted signal in the UL, for example amplifying the transmitted signal in a particular direction, or combination of directions, while seeking to attenuate the signal in other directions. In some examples, the UE may use the identified UE processing configuration for both transmission and reception of radio signals. In other examples, different configurations may be established and used by the UE for reception and transmission.

In some examples of the disclosure, the reference signal indicated to the UE may be a CSI-RS reference signal, and the indication may be included in a modified measurement grant message or configuration message. The modified measurement grant message may include not only an identification of the CSI-RS that will be sent to the UE, but also the indication that the UE should use the CSI-RS to establish a UE processing configuration for the selective enhancement of radio signals. The indication may comprise a flag within the message, or may comprise more detailed information regarding how the CSI-RS may be used by the UE. For example, the indication may indicate to the UE, or be interpreted by the UE, that the CSI-RS is usable by the UE to establish a UE processing configuration specifically for UE transmission, or for UE reception. In further examples, the indication may indicate that the CSI-RS will be used for sending future data transmissions to the UE, or will be used to send signals which are not intended for current usage by that UE or are likely to interfere with the reception of data transmissions to the UE. By providing to the UE an indication of a reference signal that the UE should use (or not use) for establishing a UE processing configuration, aspects of the present disclosure enable the UE to focus efforts to establish a UE processing configuration on only the reference signal or signals indicated by the wireless network. Instead, for example, of attempting to establish a UE processing configuration adapted to enhance each of the reference signals received by the UE, the UE may use its processing power and time to establish a UE processing configuration that is adapted to enhance only the indicated reference signal or signals.

FIG. 1 illustrates a first example method 100, performed in a UE, for establishing a UE processing configuration for the selective enhancement of radio signals received or transmitted by the UE. The UE may be a User Equipment, as defined for example in various 3GPP standards documents, or may be any other type of wireless terminal, wireless device, mobile device, machine device, mobile station, phone, tablet computer etc. Referring to FIG. 1, in a first step 110, the UE receives from a Transmission Point (TP) of a wireless network an indication that an identified reference signal is usable by the UE for establishing a UE processing configuration. The TP may for example be a Radio Base Station, such as a NodeB or eNodeB. In other examples, the TP may be a Remote Radio Head or other distributed physical entity capable of transmitting signals from the wireless network.

In some examples of the method 100, step 110 may be accomplished by receiving a message containing the indication, which message may for example be a measurement grant message or configuration message, as illustrated at step 110a. In such examples, the reference signal indicated to the UE may be a CSI-RS signal, and the measurement grant or configuration message may include an identification of the CSI-RS signal as well as the indication that the identified CSI-RS signal is usable by the UE for establishing its UE processing configuration. The indication may in some examples be a flag, which flag may be set in the message only if the CSI-RS identified in the message is usable by the UE for establishing its UE processing configuration. In further examples, the indication may include more detailed information, for example, in examples in which more than one processing configuration is established in the UE. Such examples are discussed in further detail with reference to FIG. 3 below. In still further examples, another control message may be used, for example if the identified reference signal is a PRS or other reference signal.

Following receipt of the indication in step 110, the UE then receives the identified reference signal from a TP of the wireless network. The TP from which the UE receives a reference signal may be same TP from which the UE received the indication, or may be a different TP. The wireless network may select an appropriate TP for the transmission of the indication and reference signal or signals according to circumstances and priorities within the wireless network. The reference signal may be a CSI-RS, a PRS or another reference signal type. Having received both the indication and the reference signal, the UE is then in a position to establish a UE processing configuration, as discussed below.

On receiving the identified reference signal in step 120, the UE may then proceed to identify a UE processing configuration that is adapted to a characteristic of the identified reference signal in step 130. A characteristic may include any aspect or feature of the reference signal which determines the manner in which the reference signal is affected by reception at the UE with different UE processing configurations. The characteristic thus determines which UE processing configurations will be most effective for receiving the reference signal. One example of a characteristic may be a direction or combination of directions from which the reference signal is received. Another example characteristic may be the particular pattern of amplification experienced by the reference signal as a result of selective enhancement applied by the transmitting side. This may include an amplification pattern as a result of linear spatial processing, adaptive linear filtering, adaptive space-time precoding, etc. In some examples, the characteristic of the identified reference signal is a beamforming configuration. The beamforming configuration determines the direction and/or spread of the transmitted beam comprising the identified reference signal.

The reference signal will have been transmitted by the wireless network via the TP using a particular processing configuration of the wireless network, which processing configuration may include the choice of TP from which to transmit the signal, as well as different configuration options for a range of any or all entities involved in the preparation and transmission of the signal, and which may result in selective enhancement of the signal. Such configuration options may include antenna selection, antenna combining, pre- and post-processing element configuration etc. The wireless network processing configuration may thus involve configuration of a range of different physical and/or virtual elements, depending upon the nature and organisation of the wireless network. For example, signal processing may be conducted at a centralised element under control of a virtualised network function, with additional processing and transmission taking place at a remote Transmission Point, which may be one of several transmission points under the control of the processing elements. In one example of the disclosure, the processing configuration of the wireless network may comprise a beamforming processing configuration, such that the reference signal is transmitted using a particular transmission beam.

The wireless network processing configuration imparts the characteristic to the reference signal which means the signal will be affected in different ways by different UE processing configurations used by the UE to receive the signal. A UE processing configuration that is adapted to the characteristic of the reference signal is a UE processing configuration that selectively enhances the reference signal, and consequently will selectively enhance any signal transmitted by the wireless network with the same or similar characteristic, that is using the same or similar wireless network configuration as was used for the transmission of the reference signal. Identifying a UE processing configuration that is adapted, or "matched" to the characteristic of the reference signal thus comprises identifying a UE processing configuration that selectively enhances the identified reference signal in step 140. For example, the UE processing configuration may be a UE beamforming configuration. The UE beamforming configuration selectively receives or weights transmissions from a particular direction and/or spread, to enhance the receiving of the transmission beam comprising the reference signals indicated as useable for UE selective enhancement. In such examples, a UE processing configuration that is adapted to a characteristic of the reference signal is a UE beamforming configuration that results in a UE receiving beam which is matched to the transmission beam used to transmit the reference signal, selectively amplifying the reference signal as transmitted using the transmission beam.

If the UE can identify a UE processing configuration that selectively enhances the identified reference signal, then the UE may be confident that the identified UE processing configuration will also selectively enhance other signals having the same characteristic imparted by the wireless processing configuration used to transmit the reference signal. The UE may then use this identified processing configuration for reception or transmission of radio signals in step 150.

In some examples, the UE may use the identified UE processing configuration to receive later data signals sent by the wireless network using the same wireless network processing configuration as was used by the wireless network to send the identified reference signal. In some examples, the wireless network (e.g. a base station) uses the same beam as indicated as usable by the UE for establishing a UE processing configuration (e.g. beam) for future transmissions and/or reception. The UE may use the determined UE processing configuration (e.g. UE beam) for transmission and/or reception. In some examples, the UE may use the identified UE processing configuration for transmission of data signals to the wireless network, for example if the wireless network processing configuration was equivalent to a processing configuration that the wireless network will use to receive data from the UE. The UE may be guided in its use of the identified UE processing configuration by the indication received in step 110. In further examples, the UE may receive an additional configuration message instructing the UE to use the identified UE processing configuration for future reception and/or transmission operations.

In some examples of the disclosure, a UE performing the method of FIG. 1 may comprise multiple receiving units, each of which may be configured in a UE processing configuration for the reception of the identified reference signal. In such examples, the UE may identify multiple UE processing configurations, one for each of the receiving units, and the UE may select an optimal combination of the multiple UE processing configurations for the selective enhancement of the identified reference signal.

Figure 2:
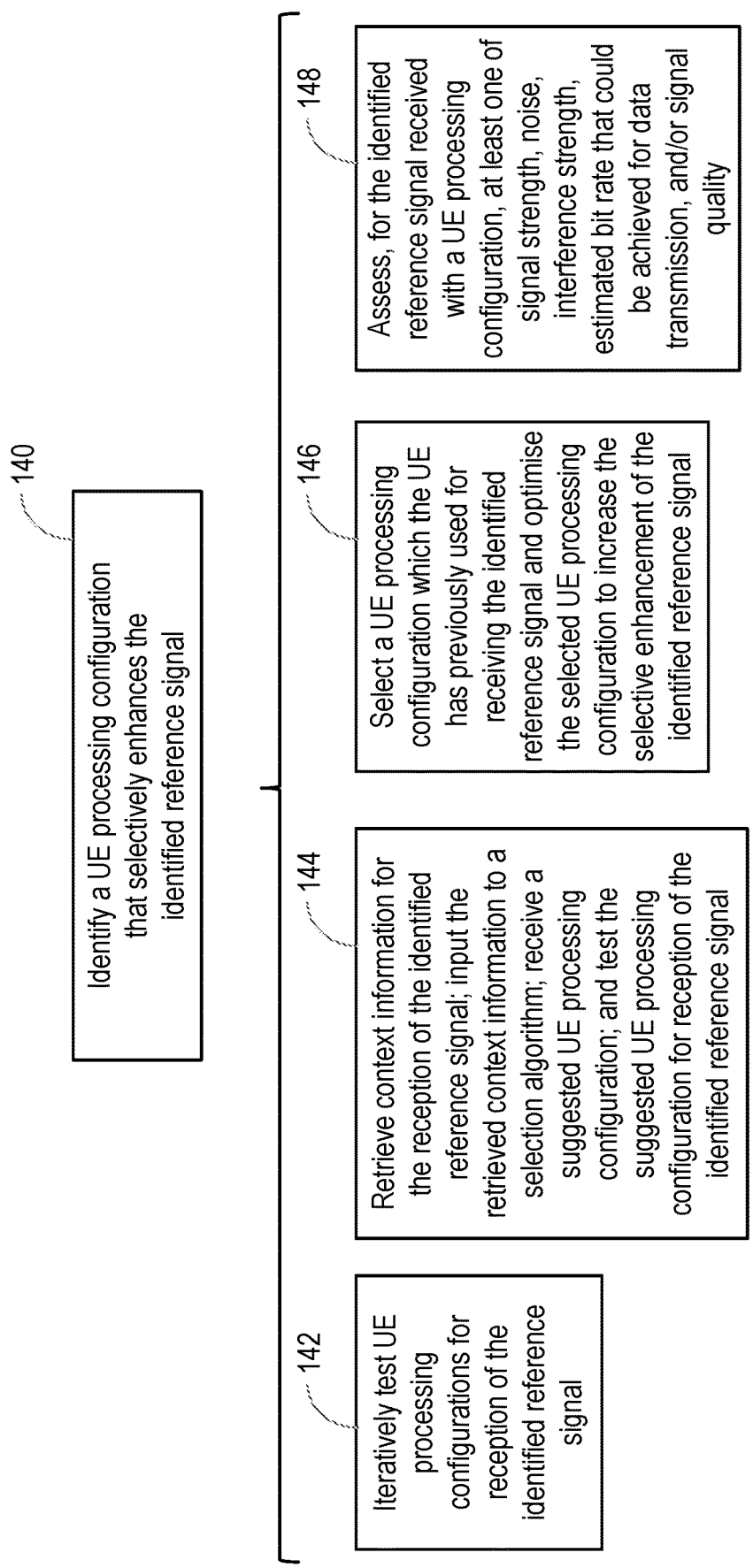
FIG. 2 is a flow chart illustrating sub-steps that may be included in the method of FIG. 1.

FIG. 2 illustrates a range of sub-steps, some or all of which may be conducted by the UE as part of the process of identifying 140 a UE processing configuration that selectively enhances the identified reference signal, according to different examples of the method 100. Referring to FIG. 2, in a first example sub-step 142, the UE may iteratively test different UE processing configurations for reception of the identified reference signal. In some examples, the iterative testing may be performed over several occurrences of reference signals transmitted from the TP. For example, the UE may attempt to evaluate only one UE processing configuration for each transmitted reference signal, so that an optimally adapted UE processing configuration is achieved after multiple reference signals have been transmitted.

In a second example sub-step 144, the UE may retrieve context information for the reception of the identified reference signal, input the retrieved context information to a selection algorithm, receive a suggested UE processing configuration from the selection algorithm, and test the suggested UE processing configuration for reception of the identified reference signal. The context information may for example be positional information of the UE, for example with reference to the TP. The selection algorithm may convert such positional information into a suggested processing configuration by hypothesising from which direction or directions the identified reference signal is likely to be received, and suggesting a UE processing configuration that will selectively enhance signals received from the hypothesised direction or directions. The UE may then iteratively test the suggested processing configuration for reception of the identified reference signal, or may assess or search in some other way for a UE processing configuration that is adapted to the characteristic of the identified reference signal. The UE may use the suggested processing configuration as a starting point for testing, or may limit its testing to only processing configurations within a certain margin of the suggested processing configuration. Other examples of context information indicating that a UE should favour a particular direction or suggested UE processing configuration may be envisaged.

In a third example sub-step 146, the UE may select a UE processing configuration which the UE has previously used for receiving the indicated reference signal, and may optimise the selected UE processing configuration to increase the selective enhancement of the indicated reference signal. This sub-step may be particularly appropriate for example if the identified reference signal is a PRS. In such a situation, the UE may already have received the identified PRS as one of the multiple PRS that are periodically transmitted by the wireless network using different wireless network processing configurations resulting in different signal characteristics. The UE may therefore have already performed initial steps to identify a UE processing configuration that is adapted to the characteristic of the identified PRS, for example as part of a UE beamforming process discussed above. On receiving the indication that a particular identified PRS should be used by the UE to identify a UE processing configuration, the UE may therefore retrieve the processing configuration that it previously identified, and may refine and optimise the previously identified processing configuration.

Referring again to FIG. 2, sub-step 148 illustrates some examples of how the UE may assess potential UE processing configurations in order to identify a UE processing configuration that selectively enhances the identified reference signal. In examples of the disclosure, the UE may assess any one or combination of: received signal power or strength, noise, interference strength of interfering signals, estimated bit rate that could be achieved for data transmission and/or signal quality. Any one or combination of these factors may be given greater or lesser weight, for example depending on the nature of the indication provided to the UE in step 110. For example, if the indication informed the UE that the identified reference signal is usable for establishing a UE processing configuration for transmission, then both received signal power and estimated bit rate that could be achieved for data transmission may be of greater importance in identifying an adapted UE processing configuration. In the presence of particularly strong interfering signals, interference strength may take precedence. Thus the manner in which potential UE processing configurations are assessed may be guided by the particular transmission and reception circumstances and priorities.

In some examples of the disclosure, the method 100 of FIGS. 1 and 2 may be performed over a limited period of time, after which the established UE processing configuration may be used by the UE for transmission and/or reception of radio signals. In such examples, the identified reference signal may be received over a sufficiently long time or sufficiently many repetitions to allow the UE to iteratively or otherwise test a number of potential UE processing configurations in order to identify a processing configuration that selectively enhances the identified reference signal. In other examples, the method 100 of FIGS. 1 and 2 may be performed by the UE substantially in parallel with data transmissions and/or receptions to and from the wireless network. In this manner, the established UE processing configuration may be continually refined and updated as conditions for the UE evolve.

As mentioned above, in some examples of the disclosure, the UE may receive an indication that more than one identified reference signal is usable by the UE to establish a UE processing configuration, and the UE may subsequently receive the more than one reference signals.

Figure 3:
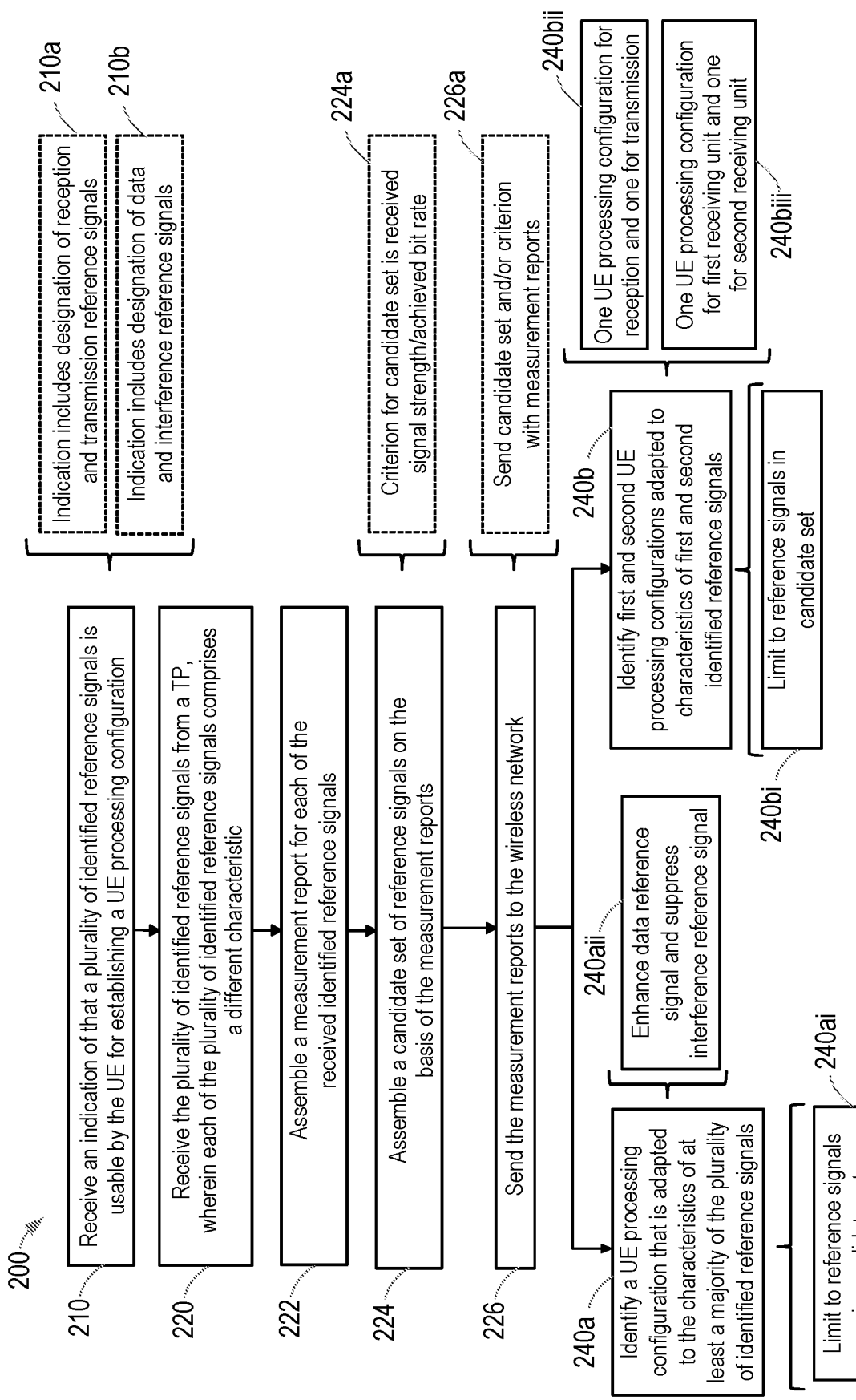
FIG. 3 is a flow chart illustrating process steps in another example of a method performed in a UE for facilitating the establishing of a UE processing configuration for the selective enhancement of radio signals received or transmitted by the UE.

FIG. 3 illustrates another example method 200 in which an indication concerning a plurality of identified reference signals is received by the UE. FIG. 3 illustrates one example of how the steps in the method 100 may be subdivided, supplemented and/or enhanced to provide the above discussed and additional functionality.

Referring to FIG. 3, in a first step 210, the UE receives an indication of a plurality of identified reference signals that are usable by the UE for establishing a UE processing configuration. As discussed above, the indication may be received as part of a message, for example a measurement grant or configuration message. The indication may be a flag included in the message or may provide additional information concerning the identified reference signals. In one example, illustrated as step 210a, the indication may designate one reference signal as usable by the UE for establishing a UE reception processing configuration, and another reference signal as usable by the UE for establishing a UE transmission configuration. The UE may thus assume that future data transmissions to the UE will have a same or similar characteristic to that of the first reference signal, for example as a consequence of a same or similar processing configuration used by the wireless network to send the future data signals. Based on the indication that the reference signal is useable for UE configuration, the UE uses only such a reference signal to determine a receive and/or transmission configuration, e.g. a beamforming configuration. A reference signal which does not have the indication of being useable by the UE for configuration, or which has an indication of not being useable by the UE for configuration, is not used by the UE for receive and/or transmission configuration.

Similarly, the UE may assume that an equivalent reception processing configuration to that used by the wireless network to transmit the second reference signal will be used by the wireless network to receive future data transmissions from the UE. In another example, illustrated as step 210b, the indication may designate one reference signal as being representative of a data reference signal, and another reference signal as being representative of an interference signal. The UE may thus assume that future data transmissions will have a similar characteristic to the data reference signal, and future transmissions that risk causing interference to the UE will have a similar characteristic to that of the interference reference signal. The UE may thus in later steps seek to identify a UE processing configuration that specifically attenuates the interference reference signal, while amplifying the reference data signal, as discussed in further detail below. In still further examples, the indication may not specify particular reference signals for particular purposes, but may for example indicate that future data transmissions to the UE will have some subset of the characteristics of the identified reference signals.

Following reception of the indication in step 210, the UE then receives the plurality of identified reference signals in step 220, each of the plurality of reference signals comprising a different characteristic. In some examples of the method 200, the UE may then assemble a measurement report for each of the received reference signals in step 222, and send the assembled measurement reports to the wireless network in step 226. The measurement reports may indicate to the wireless network the strength with which the various different reference signals were received by the UE, and may thus assist the wireless network with selection of its own processing configurations. The UE may also assemble a candidate set of the identified received reference signals in step 224 on the basis of the assembled measurement reports. The candidate set may include one or more reference signals. A criterion for inclusion of a signal in the candidate set may for example be the signal strength with which the reference signal was received by the UE, as illustrated at step 224*a*. Another criterion may be a hypothesis formed by the UE as to the highest bit rate that may be achieved with one or a combination of reference signals. The UE may then hypothesise that future data transmissions to the UE will have characteristics of reference signals in the candidate set, as these are most likely to be retained by the wireless network for future data transmissions, and the UE may thus limit its efforts to identify a UE processing configuration to only those reference signals included in the candidate set, as illustrated in steps 240*ai* and 240*bi* and discussed below. The UE may include the candidate set, and/or the criterion used to assemble the candidate set with the measurement reports that it sends to the wireless network, as shown in step 226*a*, allowing the wireless network to take this information into account in selecting its transmission processing configurations for future use.

Although the assembling and sending of measurement reports is described above in the context of a plurality of received reference signals in example method 200, it will be appreciated that a measurement report may also be assembled and sent as part of the method 100, in examples in which only a single reference signal is received by the UE. This measurement report may contain more detailed information about the single reference signal than would be included in measurement reports for multiple reference signals.

Referring again to FIG. 3, the UE may then take various alternative steps to identify a UE processing configuration, according to the nature of the indication received, the nature of the UE and its number of receiving units, and the current circumstances for the UE. Two example steps are shown in FIG. 3 for the purposes of illustration only. In a first example step, 240*a*, the UE may identify a UE processing configuration that is adapted to the characteristics of at least a majority of the plurality of indicated reference signals. As discussed above, the UE may limit the reference signals to only signals of the candidate set, as shown in step 240*ai*, and may seek to identify a UE processing configuration, or combination of UE processing configurations if the UE has multiple receiving units, that provides the best compromise in selective enhancement of the plurality of received reference signals.

In examples in which the indication designated a first reference signal as a data reference signal and a second reference signal as an interference reference signal (step 210*b*), the UE may seek to identify a UE processing configuration, or combination of processing configurations, that selectively enhances a data signal and selectively attenuates an interference signal when the data signal is transmitted with the characteristic of the data reference signal and the interference signal is transmitted with the characteristic of the interference reference signal, as illustrated in step 240*aii*. In this manner, the UE may identify a UE processing configuration that specifically attenuates a signal that the wireless network has identified as being likely to cause interference to the UE in the reception or transmission of future data transmissions.

In a second example step 240*b*, the UE may identify a first UE processing configuration that is adapted to a characteristic of at least one of the plurality of indicated reference signals, and identify a second UE processing configuration that is adapted to a characteristic of another of the plurality of indicated reference signals. As previously, the UE may limit to consideration only of those reference signals in the candidate set, as shown in step 240*bi*. In examples in which the indication designated one reference signal as usable by the UE for establishing a UE reception processing configuration, and another reference signal as usable by the UE for establishing a UE transmission configuration, the identified UE processing configuration adapted to a characteristic of the first reference signal may be used by the UE as a reception processing configuration. The identified UE processing configuration adapted to a characteristic of the second reference signal may be used by the UE as a transmission processing configuration, as shown in step 240*bii*. In a further example, the first identified UE processing configuration may be for a first receiving unit of the UE, and the second identified UE processing configuration may be for a second receiving unit of the UE, as shown in step 240*biii*. In further examples, at least some of the plurality of reference signals may be accompanied by an identifier, and the UE may store the identified UE processing configuration for each reference signal with the appropriate identifier. In this manner if the UE is later notified of a particular identifier, the UE may use the UE processing configuration stored with that identifier for subsequent data reception or transmission.

Following identification of the one or more UE processing configurations or combination of processing configurations in step 240*a* or 240*b*, the UE may then proceed to use the identified UE processing configurations for transmission and/or reception in a step 250 (not shown).

In some examples of the disclosure, the wireless network may initiate multiple instances of the method 100 and/or 200, and may assign a process identifier to each instance. The instances may vary for example in the wireless network processing configuration(s) used to transmit the identified reference signal(s) and hence in the reference signal characteristics, or in the indication provided to the UE concerning the use of certain signals as representative of data or interference signals. The UE may establish a UE processing configuration or configurations as a consequence of each instance of the method 100 or 200 and may store the established configuration, configurations or combination of configurations along with the process identifier assigned by the wireless network. The wireless network may then signal a process identifier to the UE prior to a future transmission or reception, allowing the UE to retrieve the stored UE processing configuration(s) or combination of configurations corresponding to the process identifier and to use the retrieved UE processing configuration(s) or combination of configurations for the subsequent reception or transmission.

Figure 4:
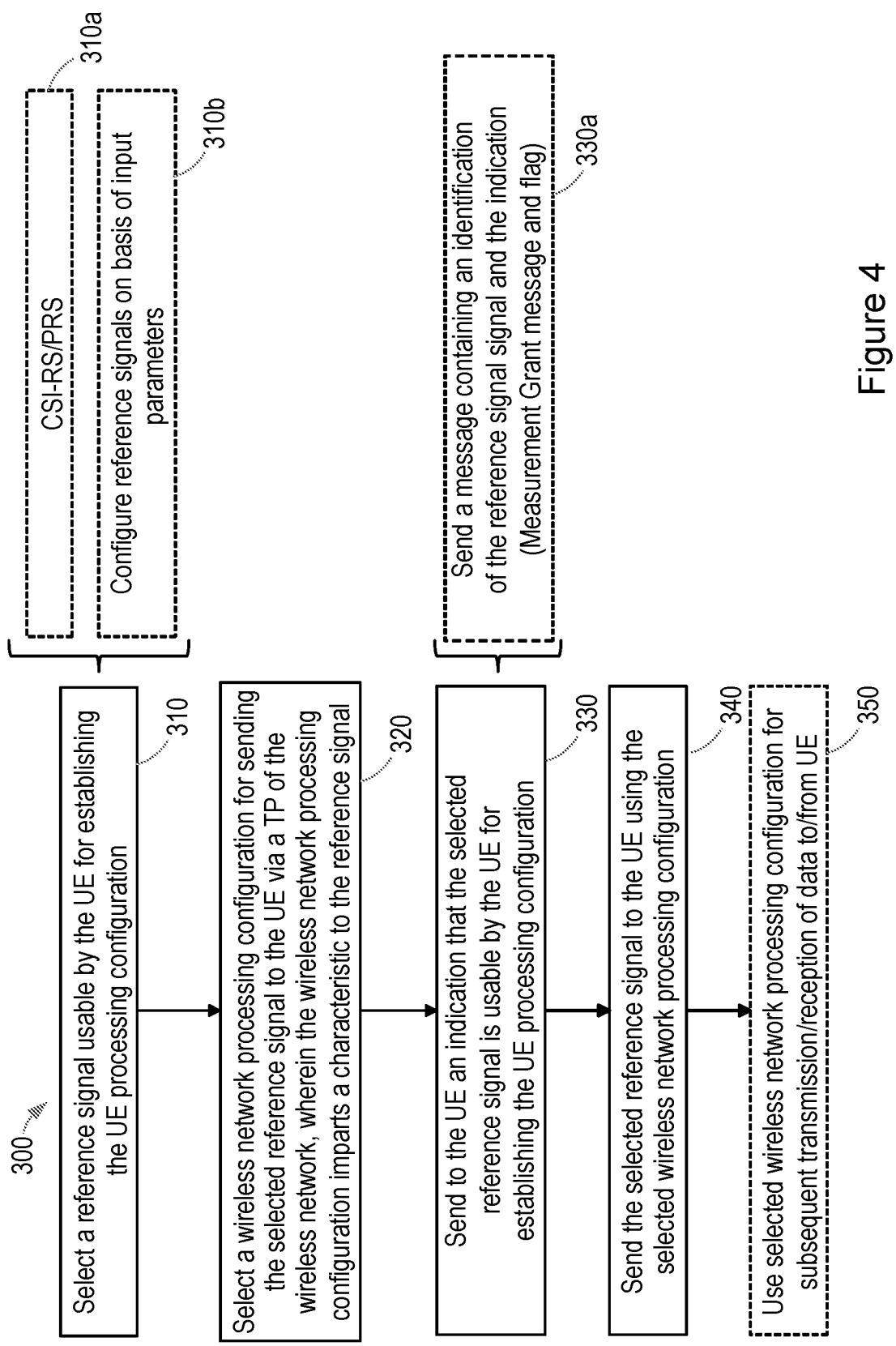
FIG. 4 is a flow chart illustrating process steps in a method performed in a wireless network for facilitating the establishment in a UE of a UE processing configuration for the selective enhancement of radio signals received or transmitted by the UE.

FIG. 4 illustrates an example method 300, performed in a wireless network for facilitating the establishment in a UE of a UE processing configuration for the selective enhancement of radio signals received or transmitted by the UE. Referring to FIG. 4, the method 300 comprises a first step 310 of selecting a reference signal or signals usable by the UE for establishing the UE processing configuration. The reference signal(s) may for example be CSI-RS or PRS, as illustrated in step 310*a*, or may be another type of reference signal. The wireless network may configure the reference signals based on a number of input parameters as shown in step 310*b*. The input parameters may include, for example, radio propagation, mobility of the UE, the number and characteristics of available UE processing configurations, the estimated UE speed, system load and/or performance requirements, for example in terms of coverage. The wireless network then selects one or more wireless network processing configurations for sending the selected reference signal(s) to the UE via a TP of the wireless network in step 320. The selected wireless network processing configuration(s) impart a characteristic to each reference signal, and may have the effect of selectively enhancing the reference signals. The wireless network may select a single wireless network processing configuration or a plurality of wireless network processing configurations, and may for example select a wireless network processing configuration that will be used for the transmission or reception of data signals to/from the UE, or for the transmission or reception of data signals that risk to cause interference to the UE. Alternatively the wireless network may select a plurality of wireless network processing configurations that are candidates for use in later data transmissions to/from the UE. As discussed above, a wireless network processing configuration may include both a choice of Transmission Point for the relevant reference signal, and configuration options for transmission elements involved in the preparation and transmission of the selected reference signal, including configuration of antenna selection, combining, signal pre- and post-processing etc. The wireless network processing configuration may thus involve configuration of a range of different physical and/or virtual elements, depending upon the nature and organisation of the wireless network. In some examples of the disclosure, the wireless network configuration may comprise a beamforming configuration.

After selecting the wireless network processing configuration and reference signal(s), the wireless network then proceeds, in step 330, to send to the UE an indication that the selected reference signal(s) is/are usable by the UE for establishing the UE processing configuration. As discussed above, this may comprise for example sending a message including an identification of the reference signal or signals and the indication. The indication may be a flag or may contain more detailed information, for example designating particular reference signals for transmission or reception or as data or interference reference signals. The message may for example be a measurement grant or configuration message, for example if the reference signal(s) is/are CSI-RS. In some aspects, the indication that the reference signals should be used by the UE for determining a UE processing configuration (e.g. beamforming) is additional to the identification of the reference signal as a particular type of reference signal. For example, the reference signal may be identified as a type of reference signal by its allocation of resources in a measurement grant or configuration message. Some reference signals of a particular type (e.g. CSI-RS) may be useable by the UE to set up the UE configuration, but some reference signals of that type may not be useable or suitable, e.g. to enable fast detection of new beams(s) in case the UE is moving. The indication provides to the UE additional information that the reference signal is useable (is intended to be used) for UE configuration (e.g. UE receive beamforming). This indication is in addition to the identification of the type of reference signal.

The wireless network then sends, in step 340, the selected reference signal(s) to the UE using the selected wireless network processing configuration(s). The indication and reference signals may be sent using the same or different Transmission Points. The wireless network may then proceed to use one or more of the selected wireless network processing configurations for the transmission and/or reception of data to/from the UE in step 350.

The method 300 may also comprise the steps of receiving measurement reports from the UE concerning the sent reference signals, and selecting a wireless network configuration for future use on the basis of the measurement reports. The wireless network may also receive from the UE a candidate set, and/or criterion used by the UE to assemble the candidate set, and may take this into account in the selection of wireless network processing configurations for future use.

As discussed above, the methods 100 and 200 may be carried out by a UE, which may for example be a User Equipment, as defined in various 3GPP standards documents, or may be any other type of wireless terminal, wireless device, mobile device, machine device, mobile station, phone, tablet computer etc. The method 300 may be carried out by a wireless network entity, which may comprise one or more physical and/or virtual elements within the wireless network operating in cooperation. Examples of such elements may include a NodeB, Radio Network Controller, eNodeB, active antenna, digital unit, baseband unit, Remote Radio Head, Virtualised Network Function (VNF), VNF for control of Radio Access Network elements etc.

Figure 5:
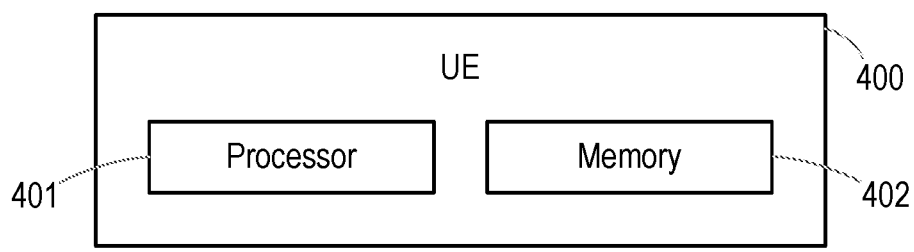
FIG. 5 is a block diagram illustrating functional units in a UE.

FIG. 5 illustrates an example UE 400 which may implement the methods 100, 200 for example on receipt of suitable instructions from a computer program. Referring to FIG. 5, the UE 400 comprises a processor 401 and a memory 402. The memory 402 contains instructions executable by the processor 401 such that the UE 400 is operative to conduct some or all of the steps of the methods 100 and/or 200.

In some examples, a User Equipment, UE, is configured to establish a UE processing configuration for the selective enhancement of radio signals received or transmitted by the UE. The UE comprises a processor and a memory, the memory containing instructions executable by the processor whereby the UE is operative to implement the method of any example. For example, the UE is operative to receive from a Transmission Point of a wireless network an indication that an identified reference signal is usable by the UE for establishing a UE processing configuration; and receive the identified reference signal from a Transmission Point of the wireless network.

Figure 6:
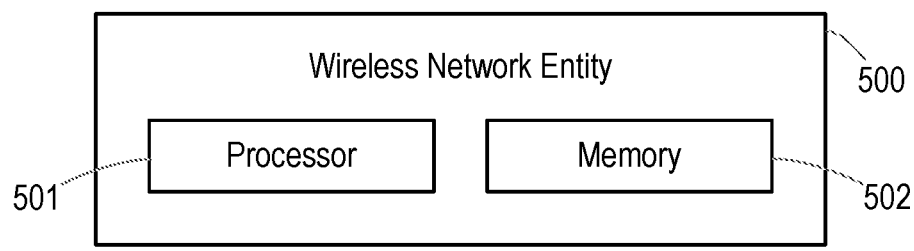
FIG. 6 is a block diagram illustrating functional units in a wireless network.

FIG. 6 illustrates an example of a wireless network entity 500, which may implement the method 300, for example on receipt of suitable instructions from a computer program. Referring to FIG. 6, the wireless network entity 500 comprises a processor 501 and a memory 502. The memory 502 contains instructions executable by the processor 501 such that the wireless network entity 500 is operative to conduct examples of the method 300.

In some examples, a wireless network entity is configured to facilitate the establishment, in a User Equipment, UE of a UE processing configuration for the selective enhancement of radio signals received or transmitted by the UE. The wireless network entity comprising a processor and a memory, the memory containing instructions executable by the processor whereby the wireless network entity is operative to implement the method of any example. For example, the network entity is operative to select a reference signal usable by the UE for establishing the UE processing configuration; and select a wireless network processing configuration for sending the selected reference signal to the UE via a Transmission Point of the wireless network, wherein the wireless network processing configuration imparts a characteristic to the reference signal. The entity is further operative to send to the UE an indication that the selected reference signal is usable by the UE for establishing the UE processing configuration; and send the selected reference signal to the UE using the selected wireless network processing configuration.

Figure 7:
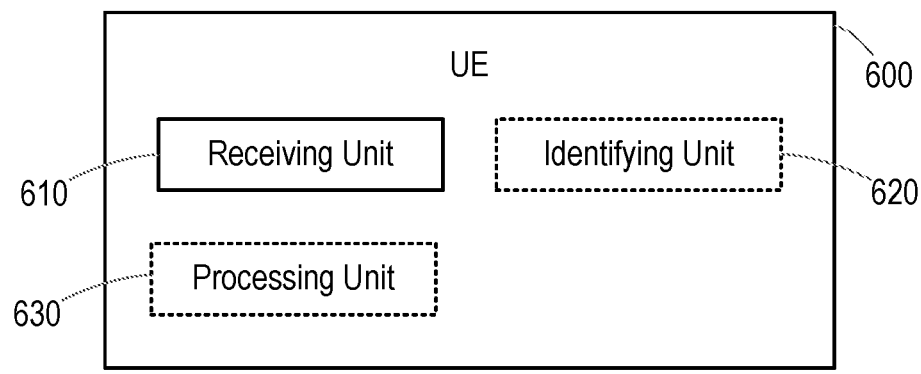
FIG. 7 is a block diagram illustrating functional units in another example of UE.

FIG. 7 illustrates an alternative example of UE 600, which may implement the methods 100, 200, for example on receipt of suitable instructions from a computer program. It will be appreciated that the units illustrated in FIG. 7 may be realised in any appropriate combination of hardware and/or software. For example, the units may comprise one or more processors and one or more memories containing instructions executable by the one or more processors. The units may be integrated to any degree.

Referring to FIG. 7, the UE 600 comprises a receiving unit 610 configured to receive from a TP of a wireless network an indication that an identified reference signal is usable by the UE for establishing a UE processing configuration, and to receive the identified reference signal from a TP of the wireless network. The UE 600 may also comprise an identifying unit 620 configured to identify a UE processing configuration that is adapted to a characteristic of the identified reference signal, and a processing unit 630 configured to use the identified UE processing configuration to perform at least one of transmitting or receiving radio signals. The identifying unit 620 may be configured to identify a UE processing configuration that is adapted to a characteristic of the identified reference signal by identifying a UE processing configuration that selectively enhances the identified reference signal. In some examples of UE, the receiving unit 610 may comprise at least one antenna and at least one signal processing unit configured to process signals received by the antenna, and the UE processing configuration may comprise a configuration of at least one of the antenna or the signal processing unit. In some examples, the UE may comprise multiple antennas, which may for example be arranged to form a phased antenna array, and the UE processing configuration may comprise a configuration of the signal processing unit to combine elements of the phased antenna array such that at least one received signal experiences constructive interference.

Figure 8:
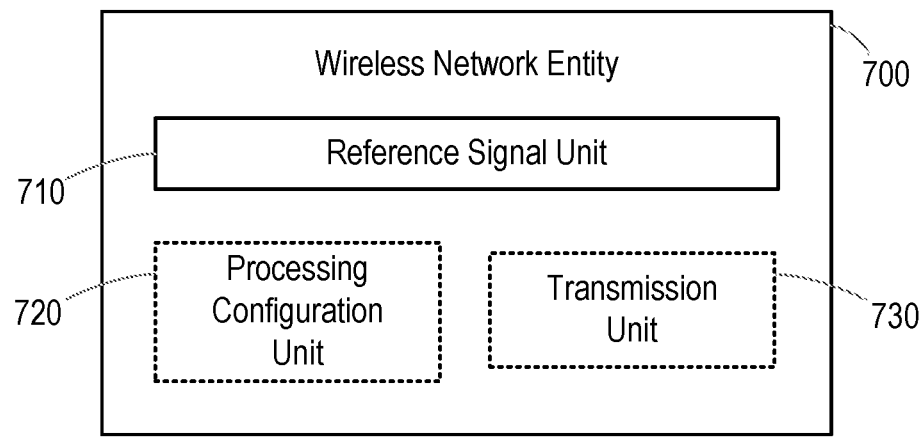
FIG. 8 is a block diagram illustrating functional units in another example of wireless network.

FIG. 8 illustrates an alternative example of wireless network entity 700, which may implement the method 300, for example on receipt of suitable instructions from a computer program. It will be appreciated that the units illustrated in FIG. 8 may be realised in any appropriate combination of hardware and/or software. For example, the units may comprise one or more processors and one or more memories containing instructions executable by the one or more processors. The units may be integrated to any degree.

Referring to FIG. 8, the wireless network entity comprises a reference signal unit 710 configured to select a reference signal usable by the UE for establishing the UE processing configuration. The wireless network entity 700 also comprises a processing configuration unit 720 configured to select a wireless network processing configuration for sending the selected reference signal to the UE via a TP of the wireless network, wherein the wireless network processing configuration imparts a characteristic to the reference signal. The wireless network entity also comprises a transmission unit 730 configured to send to the UE an indication that the selected reference signal is usable by the UE for establishing the UE processing configuration, and to send the selected reference signal to the UE using the selected wireless network processing configuration. In some examples of wireless network entity, the transmission unit 730 may be at least partially located within one or more TPs, and may comprise at least one antenna and at least one signal processing unit configured to process signals for delivery to the antenna, and the wireless network processing configuration may comprise a selection of a wireless network TP, a selection of an antenna and a configuration of at least one of the antenna or the signal processing unit. In some examples, the selected TP may comprise multiple antennas, which may for example be arranged to form a phased antenna array, and the wireless network transmission processing configuration may comprise a configuration of the signal processing unit to process signals for delivery to the phased antenna array such that at a transmitted signal experiences constructive interference in at least one direction.

Aspects of the present disclosure thus provide methods and apparatus that facilitate the establishing in a UE of a UE processing configuration for the selective enhancement of radio signals transmitted or received by the UE. A UE receives an indication from a wireless network that an identified reference signal is usable by the UE for establishing a UE processing configuration. The UE need not therefore waste time or resources using multiple PRS reference signals to establish multiple UE processing configurations, but may focus on using the indicated reference signal. In addition, a wireless network may optimise the indicated reference signal for a particular UE. For example, if a UE is moving quickly then a wireless network may indicate and send one or more reference signals relatively often. In contrast, if a UE is stationary, a wireless network may save resources by sending only very infrequent indications and reference signals. This optimisation of reference signals for particular UEs offers considerable resource savings within the UE and wireless network.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A method, performed in a User Equipment (UE), for facilitating establishing of a UE beam configuration for selective enhancement of radio signals received or transmitted by the UE, the method comprising:
   receiving identification of a plurality of reference signals, and additionally:
   receiving from a Transmission Point of a wireless network a flag indicating whether the plurality of identified reference signals has a same beam configuration or has different beam configurations, and wherein the plurality of identified reference signals comprises Channel State Information Reference Signals (CSI-RSs); and
   receiving the plurality of identified reference signals from the same or another Transmission Point of the wireless network.

2. The method as claimed in claim 1, wherein, responsive to the flag indicating that the plurality of identified reference signals has the same beam configuration, the method further comprises:

identifying a UE beam configuration that is adapted to a characteristic of the plurality of identified reference signals, by identifying a UE beam configuration that selectively enhances the plurality of identified reference signals; and using the identified UE beam configuration to perform at least one of transmitting or receiving radio signals.

3. The method as claimed in claim 2, wherein a beam characteristic of the plurality identified reference signals determines an effect of the UE beam configuration, and/or the characteristic of the plurality of identified reference signals is determined by a beam configuration used by the wireless network in transmitting the plurality of identified reference signals.

4. The method as claimed in claim 2, wherein the UE beam configuration comprises a configuration of elements in at least one of a transmitting or receiving unit in the UE, and/or, wherein the UE beam configuration comprises at least one of a radio frequency, intermediate frequency, or baseband beam configuration, or an analog or digital beam configuration.

5. The method as claimed in claim 2, wherein identifying the UE beam configuration comprises iteratively testing respective UE beam configurations for reception of the plurality of identified reference signals.

6. The method as claimed claim 2, wherein identifying the UE beam configuration comprises:
retrieving context information for the reception of the plurality of identified reference signals;
inputting the retrieved context information to a selection algorithm;
receiving a suggested UE beam configuration from the selection algorithm; and
testing the suggested UE beam configuration for reception of the plurality of identified reference signal.

7. The method as claimed in claim 2, wherein identifying the UE beam configuration comprises selecting a UE beam configuration which the UE has previously used for receiving the plurality of identified reference signals and optimizing the selected UE beam configuration to increase the selective enhancement of the plurality of identified reference signals.

8. The method as claimed in claim 2, wherein identifying the UE beam configuration comprises assessing, with respect to receiving the plurality of identified reference signals with respect to each of one or more candidate UE beam configurations, at least one of: signal strength; noise; interference strength; estimated achievable bit rate for data transmission; or signal quality.

9. The method as claimed in claim 1, wherein receiving the flag comprises receiving a message containing an identification of the plurality of reference signals, and an indication that the plurality of identified reference signals is usable for establishing a UE beam configuration.

10. The method as claimed in claim 1, further comprising:
receiving an indication that a plurality of identified reference signals is usable by the UE for establishing a UE beam configuration; and
identifying a UE beam configuration that is adapted to characteristics of at least a majority of the plurality of identified reference signals, or identifying a first UE beam configuration that is adapted to a characteristic of at least one of the plurality of identified reference signals and identifying a second UE beam configuration that is adapted to a characteristic of another of the plurality of identified reference signals.

11. The method as claimed in claim 1, further comprising:
receiving an indication that at least one reference signal in the plurality of identified reference signals is usable for establishing a reception UE beam configuration and that at least one reference signal in the plurality of identified reference signals is usable for establishing a transmission UE beam configuration;
identifying a reception UE beam configuration that is adapted to a characteristic of the at least one reference signal designated as usable for establishing the reception UE beam configuration; and
identifying a transmission UE beam configuration that is adapted to a characteristic of the at least one reference signal designated as usable for establishing the transmission UE beam configuration.

12. The method as claimed in claim 1, further comprising:
receiving an indication that includes a designation of at least one reference signal as a data reference signal and a designation of at least one reference signal as an interference reference signal; and
identifying a UE beam configuration that selectively enhances a data signal and selectively attenuates an interference signal when the data signal is transmitted with the characteristic of the data reference signal and the interference signal is transmitted with the characteristic of the interference reference signal.

13. The method as claimed in claim 1, further comprising:
Receiving an indication that includes a designation of at least one reference signal as a data reference signal and a designation of at least one reference signal as an interference reference signal; and
identifying a first UE beam configuration of a first receiving unit of the UE, and a second UE beam configuration of a second receiving unit of the UE, which in combination selectively enhance one or more among the plurality of identified reference signals.

14. The method as claimed in claim 1, further comprising:
receiving an indication that the plurality of identified reference signals is usable by the UE for establishing a UE beam configuration;
identifying a UE beam configuration that is adapted to a characteristic of the plurality of identified reference signals;
assembling a measurement report for each received identified reference signal or for combinations of received identified reference signals; and
sending the measurement reports to a Transmission Point of the wireless network.

15. The method as claimed in claim 1, further comprising:
assembling a measurement report for each received identified reference signal or for combinations of received identified reference signals;
determining a candidate set of identified reference signals among the plurality of identified reference signals, on the basis of the measurement reports; and
identifying a UE beam configuration that is adapted to a characteristic of at least one of the identified reference signals in the candidate set.

16. A method, performed in a wireless network, for facilitating establishment, in a User Equipment (UE), of a UE beam configuration for selective enhancement of radio signals received or transmitted by the UE, the method comprising:
selecting a plurality of reference signals, the plurality of reference signals comprising Channel State Information Reference Signals (CSI-RS); and
sending to the UE an identification of the plurality of reference signals, and additionally:

sending to the UE a flag indicating whether the plurality of reference signals has a same beam configuration or has different beam configurations; and sending the plurality of reference signals to the UE.

17. A User Equipment (UE) configured to establish a UE beam configuration for selective enhancement of radio signals received or transmitted by the UE, the UE comprising:
- a receiving unit configured to receive information from a Transmission Point of a wireless network that identifies a plurality of reference signals, and, additionally, a flag indicating whether the plurality of identified reference signals has a same beam configuration or has different beam configurations, wherein the plurality of identified reference signals comprises a Channel State Information Reference Signal (CSI-RS); and
- wherein the receiving unit is further configured to receive the plurality of identified reference signals from the same or another Transmission Point of the wireless network.

18. The UE as claimed in claim 17, further comprising:
- an identifying unit configured to identify a UE beam configuration that is adapted to a characteristic of the plurality of identified reference signals, responsive to the flag indicating that the plurality of identified reference signals has the same beam configuration; and
- a processing unit configured to use the identified UE beam configuration to perform at least one of transmitting or receiving radio signals;
- wherein the identifying unit is configured to identify the UE beam configuration by identifying a UE beam configuration that selectively enhances the plurality of identified reference signals.

19. The UE as claimed in claim 17, wherein the UE further comprises an identifying unit and wherein, responsive to the flag indicating that the plurality of reference signals has the same beam configuration, the identifying unit identifies a UE beam configuration that selectively enhances the plurality of identified reference signals and wherein the receiving unit comprises at least one antenna and at least one signal processing unit configured to process signals received by the antenna, wherein the UE beam configuration comprises a configuration of at least one of the antenna or the signal processing unit.

20. A wireless network entity configured to facilitate the establishment, in a User Equipment (UE), of a UE beam configuration, for selective enhancement of radio signals received or transmitted by the UE, the wireless network entity comprising a processor and a memory, the memory containing instructions executable by the processor whereby the wireless network entity is operative to:
- select a plurality of reference signals, wherein the plurality of reference signals comprises Channel State Information Reference Signals (CSI-RSs); and
- send to the UE identification information of the plurality of reference signals, and additionally:
  - send to the UE a flag indicating whether the plurality of reference signals has a same beam configuration or has different beam configurations; and
  - send the plurality of reference signals to the UE.

* * * * *